Patented Aug. 10, 1937

2,089,655

UNITED STATES PATENT OFFICE 2,089,655

LOW POUR POINT OILS

Frederick H. MacLaren, Calumet City, Ill., assignor to Standard Oil Company, Chicago, Ill., a corporation of Indiana No Drawing. Application April 24, 1933,
Serial No. 667,609

9 Claims. (Cl. 87—9)

This invention relates to low pour point oils and it pertains more particularly to a method of obtaining low pour points with pour point depressors of the condensation type without impairing the color of the finished oil.

Pour point depressors include a wide variety of substances, such as petroleum still wax, petroleum residues, asphaltic materials, etc., but by far the most effective depressors are those of the condensation type. An example of a pour point depressor of the condensation type is a product made by mixing about 100 parts of chlorinated wax (13% chlorine, 130° F. melting point) with about 10 parts of naphthalene, heating to about 130–140° F., slowly adding, with stirring, about 10 parts by weight of aluminum chloride powder (this requires about 13 to 30 minutes), and finally extracting condensation product from the reaction mixture with a chlorinated solvent or a naphtha. This composition and the method of making it is covered in my co-pending application Serial 652,285, Pat. No. 1,963,917, issued June 19, 1934. Another pour point depressor of the condensation type is prepared by causing the chlorinated wax to react with naphthalene at a temperature of about 300–400° F. with at least 2% of aluminum chloride (this only requires about five to ten minutes). Another depressor of the condensation type is made by adding a chlorinated oil to a mixture of aluminum chloride in naphthalene as described in U. S. Patent 1,815,022. Products of this general type may be referred to as pour point depressors of the condensation type.

The outstanding objection to pour point depressors of the condensation type is their dark color and their tendency to discolor the oils to which they are added. Every effort to eliminate this dark color has failed. These pour point depressors per se or in concentrations of 35% to 65% in a bright stock may be percolated to a desired color through clay, but it is found that the resulting product has lost its effect as a pour point depressor and that the dark red or black resin absorbed by the clay is the substance which is really responsible for the pour point depressor effect. Even though depressors of this type are used in very small amounts, still the color of the treated or "doped" oil may be objectionable for some purposes. The object of my invention is to provide a light colored treated or doped oil and method of making the same.

Since the active material extracted from clay is black or dark red in color it has been assumed that this color is unavoidable in doped oil. I have discovered, however, that if the pour point depressors of the condensation type are added to the oil before the oil is clayed, the oil may be clayed to the desired color without materially affecting the function of the depressor. I can offer no theory to explain this phenomenon, but repeated tests and commercial use have established it as a fact.

It appears that this particular type of pour test depressor consists of two distinct classes of substances, the color substance and the depressor substance. By acid treating, claying or otherwise refining the pour point depressor per se, these substances cannot be separated. In oil solution, however, it appears that the effective depressor is held by the oil and is not adsorbed by the clay with the color substance.

As an example of my invention I may incorporate one percent of a wax condensate into a 180 pale oil having a solid point of +30° F. and a color of 2 N. P. A. After the addition of depressor the color of the oil is 4 N. P. A. This oil was percolated through clay until its color was reduced to 1½ N. P. A., which is even lighter than the color of the original oil, and it was found that the light colored oil had a pour point of —28° F., 58° lower than the original oil.

In some instances the claying of the doped oil causes a slight rise in the pour test, but this rise is relatively insignificant. In a few cases I have actually found the pour test lower after claying than before. In the above example the pour point of the doped oil before claying was —32° F. and after claying —28° F.

In this specification the cold test temperatures referred to are the solid points which are more precise than A. S. T. M. pour points. These cold tests are usually made in accordance with A. S. T. M. specifications, but for the purpose of comparison I have made other tests, using slow chilling rates, and still other tests using shock chilling. The slow chilling method is the same as the A. S. T. M. method insofar as heating the oil to a temperature of 115° F. in a bath at 120° F., followed by cooling to 90° F. in a bath at 70° F. From this point on the sample is cooled in an air bath surrounded by a cooling bath in the same apparatus as employed for A. S. T. M. determination. The temperature of the cooling bath, however, is maintained from 5° to 10° below the temperature of the oil sample throughout the cooling operation. About four hours are necessary to chill the oil to its solid point, thus allowing a long time for the growth of wax crystals.

In the shock chilling method the sample is placed in A. S. T. M. apparatus but the surrounding bath is maintained at —60 to —70° F. Tests on the 180 pale oil doped with one percent of a pour point depressor of the condensation type are as follows:

*180 pale oil with 1.0% depressor*

|  | Stock | Doped stock | Percolated doped stock* | Percolated blank stock* |
|---|---|---|---|---|
| Slow solid test | 32° F. | —32° F. | —24° F. | 23° F. |
| A. S. T. M. solid test | 30° F. | —32° F. | —28° F. | 31° F. |
| Shock solid test | 28° F. | —30° F. | —24° F. | 32° F. |
| N. P. A. color | 2 | 4 | 1½–2 | 1½ |

* Yield=880 gals/ton No. 1 Attapulgus clay.

*180 pale oil with 0.5% depressor*

|  | Stock | Doped stock | Percolated doped stock* | Percolated blank stock* |
|---|---|---|---|---|
| Slow solid test | 32° F. | —30° F. | —22° F. | 23° F. |
| A. S. T. M solid test | 30° F. | —30° F. | —20° F. | 31° F. |
| Shock solid test | 28° F. | —22° F. | —10° F. | 32° F. |
| N. P. A. color | 2 | 3 | 1½ | 1½ |

* Yield=880 gals/ton No. 1 Attapulgus clay.

Percolations were all run 24 hours. No diluent was used in these percolations.

As another example of my invention, an S. A. E. 50 Mid-Continent lubricating oil having a color of about 3½ N. P. A. was doped with one percent of a pour point depressor of the condensation type and percolated through No. 1 clay to yield 880 gallons per ton of clay. The color of the doped oil was five to six N. P. A. and its solid point was —2° F. After percolation and reduction the color of the finished oil was three to three and one-half N. P. A. and its A. S. T. M. solid test was —3° F. which, it will be noted, is actually lower than the solid point of the oil before claying. This percolated oil is blended with S. A. E. 20 stock to make S. A. E. 30 oil. It is found that the resulting oil has a solid test of about —15° F. This is a much better cold test than is obtained by doping the S. A. E. 30 oil, which would only give a pour test of —4° F.

I have found that the above results can be obtained both when the S. A. E. 50 oil is diluted with naphtha and when it is percolated without dilution, and particular attention is directed to the fact that in this case the percolated or clayed oil has a lower pour test than the original doped oil.

Depressors of the condensation type may be used in proportions varying from about 0.1 to 2.0%.

While I have described hereinbefore certain specific pour point depressors of the condensation type, it should be understood that these are examples of pour point depressors of the condensation type. These may be defined as any non-crystalline products obtained by the condensation of normal paraffin hydrocarbons with aromatic hydrocarbons or other hydrocarbon materials which will yield a non-crystalline condensation product. Naphthenic substances, condensed ring aromatic substances and cyclic hydrocarbons generally may be employed. The normal paraffin hydrocarbon material preferably contains more than 10 carbon atoms in the molecule and preferably from 15 to 25 carbon atoms, in which case the material will usually be solid at ordinary temperatures. Condensation may be brought about by the action of a catalyst, such as aluminum chloride, boron chloride, or fluoride, etc. on the chlorinated wax or on the normal paraffin-hydrocarbon after it has been activated by chlorination, dehydrogenation, pyrolysis, etc.

The condensation may be carried out in the presence of the oil it is desired to treat. For example, chlorinated wax and naphthalene or tetralene may be dissolved in a light lubricating oil in the proportions of one part of naphthalene or tetralene to five to ten parts of chlorinated wax (containing 10–25% chlorine) and fifty parts of oil. The solution may then be treated with aluminum chloride at temperatures of about 100–400° F. The aluminum chloride sludge can be separated and the oil washed, neutralized and filtered through fuller's earth to the desired color, or the oil may be filtered through clay immediately after the separation of the aluminum chloride sludge while still in its acid condition. Unless the oil contains excessive amounts of paraffin wax it will have a low pour test and it may be blended with other wax-containing oils to lower their pour test likewise.

It is a peculiar fact that pour point depressors of the condensation type behave differently when percolated with a wax-bearing oil than when they are clayed with a diluent such as naphtha. When clayed with a lubricating oil even in amounts as high as 10% their effectiveness is not materially reduced, and the lubricating oil may be blended with other lubricating oils to lower the pour test of the resulting blend. On the other hand, when a pour point depressor is percolated with clay in naphtha solution, all of the active substances appear to be deposited on the clay and the reduced depressor is practically devoid of its desired properties.

I have found that the same phenomenon that is exhibited in the percolation of oil solutions of condensation type pour point depressors is likewise exhibited to some extent in other refining processes, such as acid treating, solvent extraction, caustic treatment, etc. The chief advantage, however, is in the treatment with clay. The treatment may be at ordinary room temperatures (70° F.) by percolation. For lubricating oils it is preferably at about 150° F. to 300° F. When it is desirable to produce oils having a green cast, temperatures as high as 400° F. to 600° F. may be employed. The treatment may be on sour oil directly after the acid treatment in the separation of acid sludge as well as on oil which has been neutralized. The high temperature processes may be carried out by the use of fuller's earth in aqueous slurries, preferably with the undiluted oil. At low temperatures the percolation may be carried out in the presence of a suitable diluent, such as oleum spirits, light naphtha, etc.

In order to obtain a product of exceptionally good color I may dilute the reaction product of chlorinated wax, aromatic material and aluminum chloride with the lubricating oil immediately after the condensation and before neutralization and washing. I may then treat this solution preferably after separation of sludge, with fuller's earth or equivalent adsorbent while still in the acid condition. The oil so treated has an exceptionally good color and high pour test depressing power and may be further neutralized and washed and added to other oils whose pour test it is desired to reduce.

Although fuller's earth has been described as the preferred treating agent in the above example, it should be understood that equivalent substances may be used, such as bentonite, acid treated clays, bauxite, silica gel and other color adsorbing metal oxides or hydroxides. Other expedients and modifications of the invention will be apparent to those skilled in the art and I do not limit myself to the specific details hereinabove set forth except as defined by the following claims, which should be construed as broadly as the prior art will permit.

I claim:

1. The method of separating color components from depressor components of pour point depressors of the condensation type, which comprises diluting said pour point depressors with 90 to 99.9% of a viscous lubricating oil and contacting the diluted mixture with a solid color-adsorbent material.

2. The method of removing color bodies from pour point depressors of the condensation type without decreasing the effectiveness of the pour point depressors, which comprises adding 0.1% to 10% of said pour point depressors to a viscous lubricating oil and contacting the oil-depressor mixture with adsorbent clay.

3. The method of lowering the pour point of a wax-containing viscous lubricating oil without materially changing the color of said viscous oil, which comprises admixing with said viscous oil 0.1% to 10% of a pour point depressor of the condensation type, and treating said mixture with clay whereby the color bodies are removed from the depressor without materially affecting its effectiveness.

4. The process of claim 2 wherein the mixture is percolated through clay at temperatures of about 70° F. to 300° F.

5. The process of claim 2 wherein the mixture is contacted with clay at temperatures of about 400° F. to 600° F.

6. The method of removing color bodies from pour point depressors of the condensation type without decreasing the effectiveness of the pour point depressor which comprises adding 0.1% to 10% of said pour point depressor to a viscous lubricating oil, diluting the mixture with a light hydrocarbon diluent and contacting the diluted oil-depressor mixture with absorbent clay, the amount of pour point depressor added to said viscous lubricating oil being based upon the diluent-free oil-depressor mixture.

7. The method of making viscous lubricating oils, which comprises condensing chlorinated paraffin wax with naphthalene by means of aluminum chloride to yield a black concentrated pour point depressor, incorporating 0.1% to 10% of of said pour point depressor in a viscous lubricating oil containing wax and subsequently contacting the viscous lubricating oil, together with the incorporated pour point depressor, with clay to remove coloring material from the mixture without affecting the effectiveness of the pour point depressor.

8. The method of removing color bodies from pour point depressors of the condensation type without decreasing the effectiveness of the pour point depressors which comprises adding 0.1% to 10% of said pour point depressors to a viscous lubricating oil having a Saybolt universal viscosity at 100° F. of at least 180 seconds and contacting the oil-depressor mixture with absorbent clay.

9. The method of removing color bodies from pour point depressors of the condensation type without decreasing the effectiveness of the pour point depressors which comprises adding 0.1% to 10% of said pour point depressors to a viscous lubricating oil having a Saybolt universal viscosity at 100° F. of about 180 to 1500 seconds and contacting the oil-depressor mixture with absorbent clay.

FREDERICK H. MacLAREN.